(12) United States Patent
Shakkarwar

(10) Patent No.: US 8,661,520 B2
(45) Date of Patent: *Feb. 25, 2014

(54) SYSTEMS AND METHODS FOR IDENTIFICATION AND AUTHENTICATION OF A USER

(76) Inventor: Rajesh G. Shakkarwar, Cupertino, CA (US)

(*) Notice: Subject to any disclaimer, the term of this patent is extended or adjusted under 35 U.S.C. 154(b) by 1197 days.

This patent is subject to a terminal disclaimer.

(21) Appl. No.: 11/562,330

(22) Filed: Nov. 21, 2006

(65) Prior Publication Data

US 2008/0120717 A1   May 22, 2008

(51) Int. Cl.
*G06F 12/14* (2006.01)

(52) U.S. Cl.
USPC ............... 726/10; 713/183; 713/186; 705/75

(58) Field of Classification Search
USPC ..................... 713/183, 186; 726/10; 705/75
See application file for complete search history.

(56) References Cited

U.S. PATENT DOCUMENTS

| | | | |
|---|---|---|---|
| 5,715,314 A | | 2/1998 | Payne et al. |
| 5,815,665 A | | 9/1998 | Teper et al. |
| 5,870,723 A | | 2/1999 | Pare et al. |
| 5,905,736 A | | 5/1999 | Ronen et al. |
| 6,000,832 A | * | 12/1999 | Franklin et al. ............. 700/232 |
| 6,163,771 A | | 12/2000 | Walker et al. |
| 6,233,565 B1 | | 5/2001 | Lewis et al. |
| 6,263,447 B1 | | 7/2001 | French et al. |
| 6,766,373 B1 | | 7/2004 | Beadle et al. |
| 6,839,689 B2 | | 1/2005 | Aieta et al. |
| 6,857,073 B2 | | 2/2005 | French et al. |
| 6,871,278 B1 | | 3/2005 | Sciupac |
| 7,162,475 B2 | | 1/2007 | Ackerman |
| 7,225,156 B2 | | 5/2007 | Fisher et al. |
| 7,231,657 B2 | | 6/2007 | Honarvar et al. |
| 7,234,156 B2 | | 6/2007 | French et al. |
| 7,290,288 B2 | * | 10/2007 | Gregg et al. .................. 726/28 |

(Continued)

FOREIGN PATENT DOCUMENTS

| | | |
|---|---|---|
| JP | 02-101573 | 4/1990 |
| WO | 03/038719 | 5/2003 |
| WO | 2006-118968 | 11/2006 |

OTHER PUBLICATIONS

International Search Report. Jul. 8, 2008.

(Continued)

*Primary Examiner* — Amare F Tabor
(74) *Attorney, Agent, or Firm* — Patterson & Sheridan, LLP

(57) ABSTRACT

The present invention generally relates to a computer security system for use in the identification and authentication of a user prior to an on-line transaction. In one aspect, a method for enrolling a user in a system configured to identify and authenticate the user is provided. The method includes collecting a username and password to identify the user. The method further includes extracting device data from a user machine to uniquely identify the machine. The method also includes generating a user profile based upon the device data and the username and password. Additionally, the method includes transmitting the user profile to a server machine to be stored. In another aspect, a computer-readable medium including a set of instructions that when executed by a processor cause the processor to enroll a user in a system configured to identify and authenticate the user is the provided. In yet a further aspect, a system for identifying and authenticating a user is provided.

28 Claims, 9 Drawing Sheets

(56) References Cited

U.S. PATENT DOCUMENTS

| | | | |
|---|---|---|---|
| 7,292,999 | B2 | 11/2007 | Hobson et al. |
| 7,454,623 | B2* | 11/2008 | Hardt ............................ 713/182 |
| 8,024,568 | B2* | 9/2011 | Rao et al. ...................... 713/168 |
| 2001/0047297 | A1 | 11/2001 | Wen |
| 2002/0053035 | A1 | 5/2002 | Schutzer |
| 2002/0073339 | A1 | 6/2002 | Card |
| 2003/0105681 | A1 | 6/2003 | Oddo |
| 2004/0010685 | A1 | 1/2004 | Sakaguchi |
| 2004/0010720 | A1 | 1/2004 | Singh et al. |
| 2004/0073809 | A1* | 4/2004 | Wing Keong ................. 713/201 |
| 2005/0119979 | A1 | 6/2005 | Murashita et al. |
| 2005/0246292 | A1 | 11/2005 | Sarcanin |
| 2006/0106734 | A1 | 5/2006 | Hoffman et al. |
| 2006/0124756 | A1 | 6/2006 | Brown |
| 2006/0156385 | A1* | 7/2006 | Chiviendacz et al. ............ 726/2 |
| 2006/0173781 | A1 | 8/2006 | Donner |
| 2006/0177061 | A1 | 8/2006 | Orsini et al. |
| 2006/0212407 | A1 | 9/2006 | Lyon |
| 2006/0242058 | A1 | 10/2006 | Torto |
| 2006/0282660 | A1* | 12/2006 | Varghese et al. .............. 713/155 |
| 2006/0282662 | A1* | 12/2006 | Whitcomb .................... 713/156 |
| 2007/0022301 | A1* | 1/2007 | Nicholson et al. ............ 713/184 |
| 2007/0053518 | A1 | 3/2007 | Tompkins et al. |
| 2007/0079136 | A1* | 4/2007 | Vishik et al. .................. 713/186 |
| 2007/0142032 | A1 | 6/2007 | Balsillie |
| 2007/0209065 | A1* | 9/2007 | Branam et al. .................... 726/5 |
| 2007/0220253 | A1* | 9/2007 | Law .............................. 713/168 |

OTHER PUBLICATIONS

International Search Report. Sep. 29, 2008.
ICharge Web, 2006 (available at: http://web.archive.org/web/20060819032423/http://www.xilo.com/icharqe.htm).
ZefaMedia, 2006 (available at: http://www.zefamedia.co.nz/blog/2006/4/13/environmentally-friendlier-pop-ups.html).
Bloch, Michael, "Taming the Beast," available at http://web.archive.org/web/20051024002014/http://www.tamingthebeast.net/articles3/ (2005).
U.S. Appl. No. 11/943,792, Final Office Action dated Apr. 14, 2009.
U.S. Appl. No. 11/562,353, Notice of Allowance dated Apr. 20, 2009 (provided as explanation of relevance of JP 02-101573).
U.S. Appl. No. 11/668,541, Office Action dated Jun. 23, 2009.
Marriam-Webster's Collegiate Dictionary, tenth edition, p. 241, definition of "configure". 1998.
"Final Office Action, U.S. Appl. No. 11/668,541, dated Dec. 10, 2009."
Merriam-Webster's Collegiate Dictionary, 10th Edition, definitions of "collect" and "verify."
Office Action, U.S. Appl. No. 11/668,541, dated Mar. 2, 2010.
Harold, E.R. "Virtual Account Numbers," Aug. 29, 2006, retrieved Jun. 21, 2010 from http://web.archive.org/web/20060829000813/http://www.elharo.com/blog/privacy/2006/05/17/virtual-account-numbers/.
EP Search Report, EP Appl. No. 07 87 3624, mailed Jul. 16, 2010.
Final Office Action, U.S. Appl. No. 12/470,203, dated Aug. 1, 2011.
EP Examination Report for Application No. 07 873 624.6-2212 dated Oct. 8, 2012.
EP Official Communication for Application No. 07 873 624.6-2212 dated Feb. 11, 2011.
EP Official Communication for Application No. 07 873 624.6-2212 dated Apr. 12, 2011.
EP Official Communication for Application No. 07 873 624.6-2212 dated Aug. 17, 2011.
EP Official Communication for Application No. 07 873 624.6-2212 dated Feb. 4, 2013.
EP Official Communication for Application No. 07 873 624.6-2212 dated May 14, 2013.

* cited by examiner

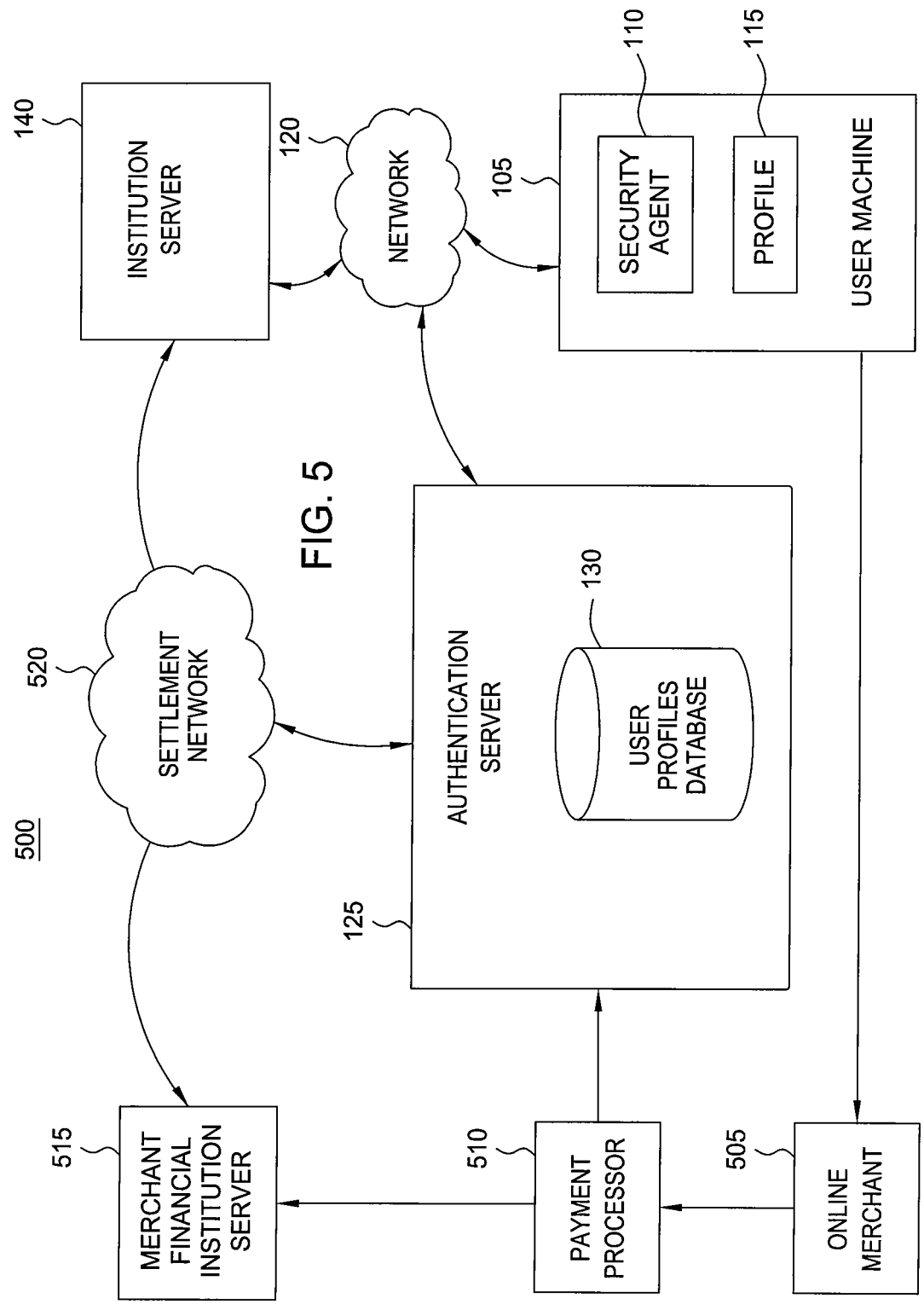

FIG. 6

Merchant.com

World Wide Web

Item
Classic Dress Shirt
Unit Price: $89.50
Color: Light Blue
SIZE: 16-33
STYLE: 124649

Usually arrives in 5-8 business days.
Add a Gift Box or Note

Summary

Payment Information

Pay with a Gift Card
Only one gift card may be used per order. For details on using your gift card click here.

Gift Card Number:
Access Number: A 3-digit number on the back, upper-right corner of your card.

Update my order with Gift Card
[Update]

Pay with a Credit Card
Card Type: [Merchant Card ▼]
Card Number: _____ (no hyphens or spaces)
Expiration Date: [None ▼] [None ▼]
Billing Address: [_____ ▼]

Add Billing Address | Edit Billing Address
☐ Save my credit card information

Your billing address must match the address on your credit card statement or your credit card may be denied.

---

Financial Institution — PAYMENT [exit]

AVAILABLE ACCOUNTS - JOHN SMITH

☐ account: Debit Checking 1    payment due: $0
  balance: $14,533

☐ account: Debit Checking 2    payment due: $0
  balance: $2,444

☒ account: Financial Institution securePAY Credit    payment due: $345
  balance: $12,000

☐ account: Financial institution MasterCard    payment due: $960
  balance: $8,355

TODAY — 705
Track your monthly spending for FREE
Learn How ▲

First Home? Selling?
Moving up?
Get the answers you're seeking.
> Download a free gift today!

SYSTEMS AND METHODS FOR IDENTIFICATION AND AUTHENTICATION OF A USER

BACKGROUND OF THE INVENTION

1. Field of the Invention

The present invention generally relates to computer security and more specifically to systems and methods for identifying and authenticating a user.

2. Description of the Related Art

Internet commerce has increased dramatically over the last several years. As a result, several different on-line payment methods have been created. In one payment method, the buyer simply types a credit card number into an on-line payment webpage to pay for the goods or services provided by an on-line merchant. In another payment method, the buyer uses an on-line payment service to pay for the goods or services provided by an on-line merchant. The on-line payment service allows the buyer to pay the on-line merchant via the Internet using funds that are available in a bank account or on a credit card. The on-line payment service holds the account information, not the on-line merchant, and therefore the on-line payment service may protect the buyer from unlawful use of the buyer's account.

Even though on-line payment services are effective in providing a more secure means of on-line payment between the buyer and the on-line merchant as compared to paying by a credit card number or a personal check, on-line payment services typically require a single factor of authentication to verify that the buyer is actually the owner of the account. For example, the on-line payment service may require the buyer to input an email address and a password to make an on-line payment. However, the single factor of authentication, such as the email address and password, can be easily stolen by a computer hacker. This may result in the unlawful use of the buyer's account, which is a common form of identity theft.

In addition to Internet commerce, many banks now offer on-line banking which allows customers to access their accounts via the Internet. On-line banking allows a customer to perform routine transactions, such as account transfers, balance inquiries, bill payments, and stop-payment requests from a remote computer. In addition, some banks allow their customers to apply for loans and credit cards on-line as well. Similar to on-line payment services, to access the account information or apply for a loan or a credit card on-line, a bank usually requires only one factor of authentication to verify that an on-line customer is actually the owner of the account. For example, the bank may require the customer to input a username and a password to access the account. Again, the single factor of authentication, such as the username and password, can be easily stolen by a computer hacker, which may result in the unlawful use of the customer's account.

As the foregoing illustrates, there is a need in the art for a way to verify the identities of on-line customers that is more secure than current approaches.

SUMMARY OF THE INVENTION

The present invention generally relates to a computer security system for use in the identification and authentication of a user prior to an on-line transaction. In one aspect, a method for enrolling a user in a system configured to identify and authenticate the user is provided. The method includes collecting a username and password to identify the user. The method further includes extracting device data from a user machine to uniquely identify the machine. The method also includes generating a user profile based upon the device data and the username and password. Additionally, the method includes transmitting the user profile to a server machine to be stored.

In another aspect, a computer-readable medium including a set of instructions that when executed by a processor cause the processor to enroll a user in a system configured to identify and authenticate the user is provided. The processor performs the step of collecting a username and password to identify the user. The processor also performs the step of extracting device data from a user machine to uniquely identify the machine. Further, the processor performs the step of generating a user profile based upon the device data and the username and password. Additionally, the processor performs the step of transmitting the user profile to a server machine to be stored.

In yet a further aspect, a system for identifying and authenticating a user is provided. The system includes a server machine that includes a user profiles database. The system also includes a computing device having a processor and a memory. The memory includes a security agent program configured to collect a username and password to identify the user. The security agent program is also configured to extract device data from a user machine to uniquely identify the machine. Further, the security agent program is configured to generate a user profile based upon the device data and the username and password. Additionally, the security agent program is configured to transmit the user profile to the server machine for storage in the user profiles database.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a conceptual block diagram of a system through which a secured payment may be made, according to one embodiment of the invention.

FIGS. 6-8 are conceptual illustrations depicting how the security agent of FIG. 1 interacts with a merchant payment web page when a secured payment is made, according to one embodiment of the invention.

DETAILED DESCRIPTION

In general, the invention relates to a computer security system for use in the identification and authentication of a user prior to an on-line transaction. The system will be described herein in relation to a single user. However, it should be understood that the systems and methods described herein may be employed with any number of users without departing from the principles of the present invention. The description of the invention is separated into four sections: the architecture, the enrollment process, a secure access transaction, and a secure payment transaction. To better understand the novelty of the system of the present invention and the methods of use thereof, reference is hereafter made to the accompanying drawings.

Architecture

Figure 1:
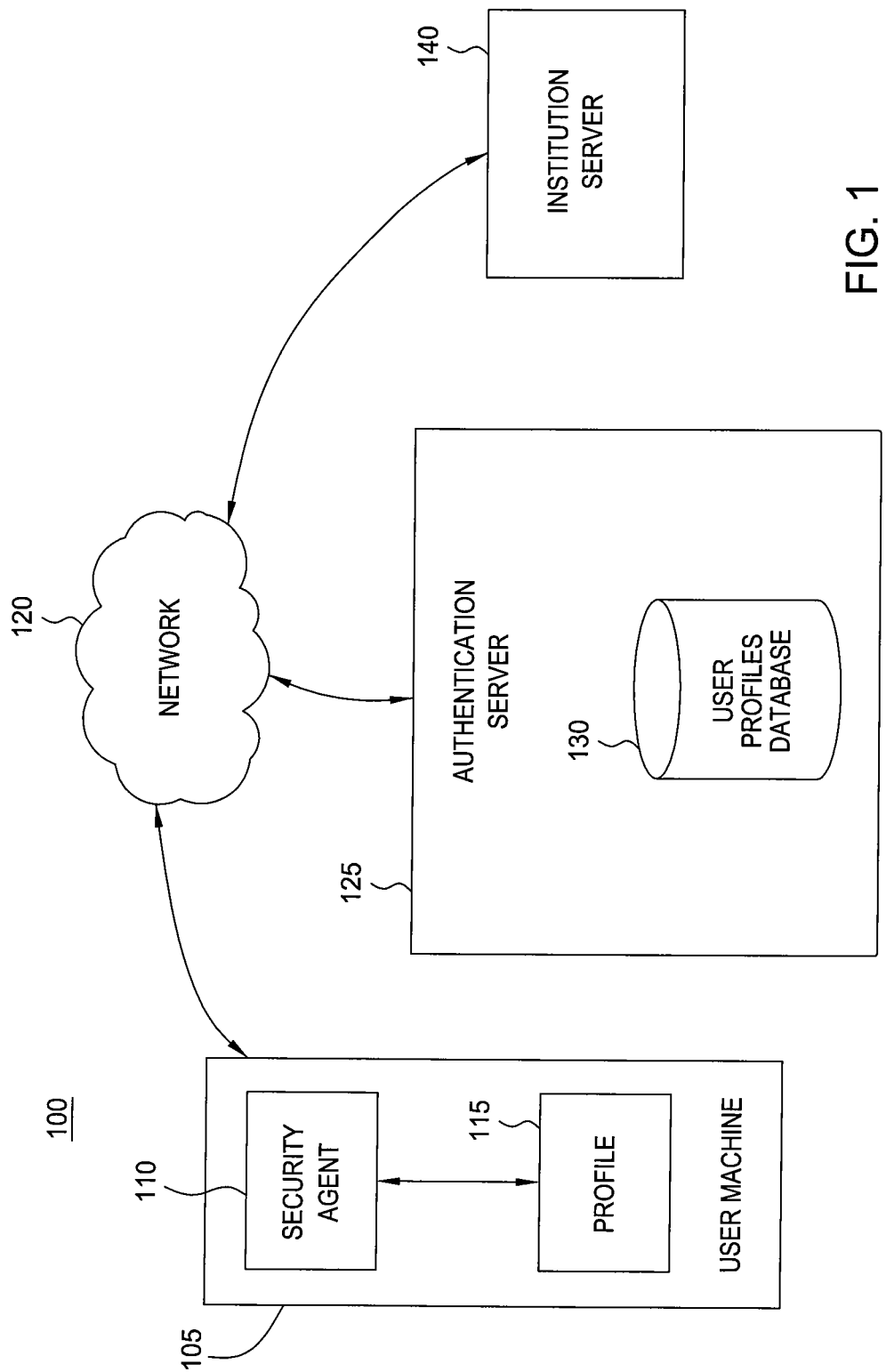
FIG. 1 is a conceptual block diagram of a system configured to identify and authenticate the identity of a user, according to one embodiment of the invention.

FIG. 1 is a conceptual block diagram of a system 100 configured to identify and authenticate the identity of a user, according to one embodiment of the invention. The system 100 includes a user machine 105, which may be any type of individual computing device such as, for example, a desk-top computer, a lap-top computer, a hand-held phone device, or a personal digital assistant. Generally, the user machine 105 is configured to be a communication link between the user and the other components in the system 100. The user machine 105 includes a security agent 110. Generally, the security agent 110 is a software entity that runs on the user machine 105. As described in further detail herein, the security agent 110, among other things, is configured to create an identity profile 115 of a user and of user machine 105, collect certain data from the user machine 105 or manage secure access or secure payment transactions made from user machine 105. Additionally, the security agent 110 is designed to offer protection against phishing, pharming, Trojan programs or worms.

As also shown, the user machine 105 includes the profile 115, which represents the identity of the user. The profile 115 is unique for each user. As described in further detail herein, once the profile 115 has been created for the user, the identity of the user can be subsequently verified by a series of interactions between the security agent 110 and the authentication server 125 based on the profile 115. The profile 115 includes data about the user and the user machine 105 and can be used to establish a multifactor identification for the user whenever the user attempts to conduct transactions via the user machine 105. The first factor of authentication is a username and/or password, which relates to "what the user knows." The second factor of authentication is unique information about the user machine 105, which relates to "what the user has." The third factor of authentication is unique information about the user, such as biometric identity, which relates to "who the user is."

As will be discussed below in the enrollment process, the username and/or password is created by the user after the identity of the user is established. The username and/or password are typically a combination of characters and numbers, which the user can easily remember. In one embodiment, the user machine 105 transmits the username and/or password in a cryptographically protected form, so access to the actual username and/or password will be difficult for a snooper who gains internal access to the user machine 105.

With respect to the second factor of authentication, the unique information about the user machine 105 is generally a combination of select information associated with the user machine 105. The information may be static or dynamic. For instance, the information may include the International Mobile Equipment Identity (IMEI), which is a number unique to every mobile phone, the International Mobile Subscriber Identity (IMSI), which is a unique number associated with network mobile phone users, and/or the geolocation of the user machine 105, which is a real-world geographic location of a network connected computer or mobile device. The information about the user machine 105 may also include machine-level attributes. For instance, the information may include various parameters available through a PCI configuration space, like the Device ID or the Vendor ID for different system devices, the data residing in the SMM memory space, or other memory hardware attributes, such as memory type, memory clock speed, amount of memory, hard drive serial number, size of hard drive, maker of hard drive etc., and/or chipset information or graphics card information, which can be used to read hidden and/or unhidden registers within those subsystems. Further, the information may include data at different locations in firmware or BIOS or information available in a Microcode patch or a checksum of a portion of the firmware within the user machine 105.

In addition to the foregoing, the information about the user machine 105 may also be system-level attributes. For instance, the information may include a MAC address, hard drive serial number, hardware configuration information, such as interrupt routing, GPIO routing, PCI Device Select routing or a hardware configuration map, operating system registry, CPU type, CPU version or CPU clock speed. The information about the user machine 105 may also include system pattern extraction. For instance, the information may include a directory structure and/or a list of installed applications, such as a word processor or other computer tools.

The third factor of authentication consists of unique information about the user, such as a biometric identity. The biometric data may include the specific typing pattern of the user since each user's typing behavior is unique. Typically, typing authentication works by requesting that a user seeking access to a computer or a password-protected file just type a short passage into the computer so that the user's typing pattern can be analyzed and matched against a known pattern. Additionally, the biometric data may also be generated by a biometric device, such as a fingerprint device or an iris pattern device, included within the user machine 105.

The system 100 further includes a network 120, which may be any type of data network, such as a local area network (LAN), a metropolitan area network (MAN), a wide area network (WAN), or the Internet. The network 120 is configured to act as a communication pathway between the user machine 105, the authentication server 125, and an institution server 140. The authentication server 125 stores a copy of the profile 115 generated during the enrollment process in a user profiles database 130. Additionally, the authentication server 125 interacts with the agent 110 via the network 120 during the secure access transaction and the secure payment transaction, as described below. The institution server 140 stores sensitive information for the user e.g. financial account information, confidential data, etc. The institution server 140 may be part of a bank, a building society, a credit union, a stock brokerage, or other businesses holding sensitive data. Generally, the institution server 140 interacts with the agent 110 via the network 120 during the enrollment process, a secure access transaction or a secure payment transaction, as described below.

Enrollment Process

Figure 2:
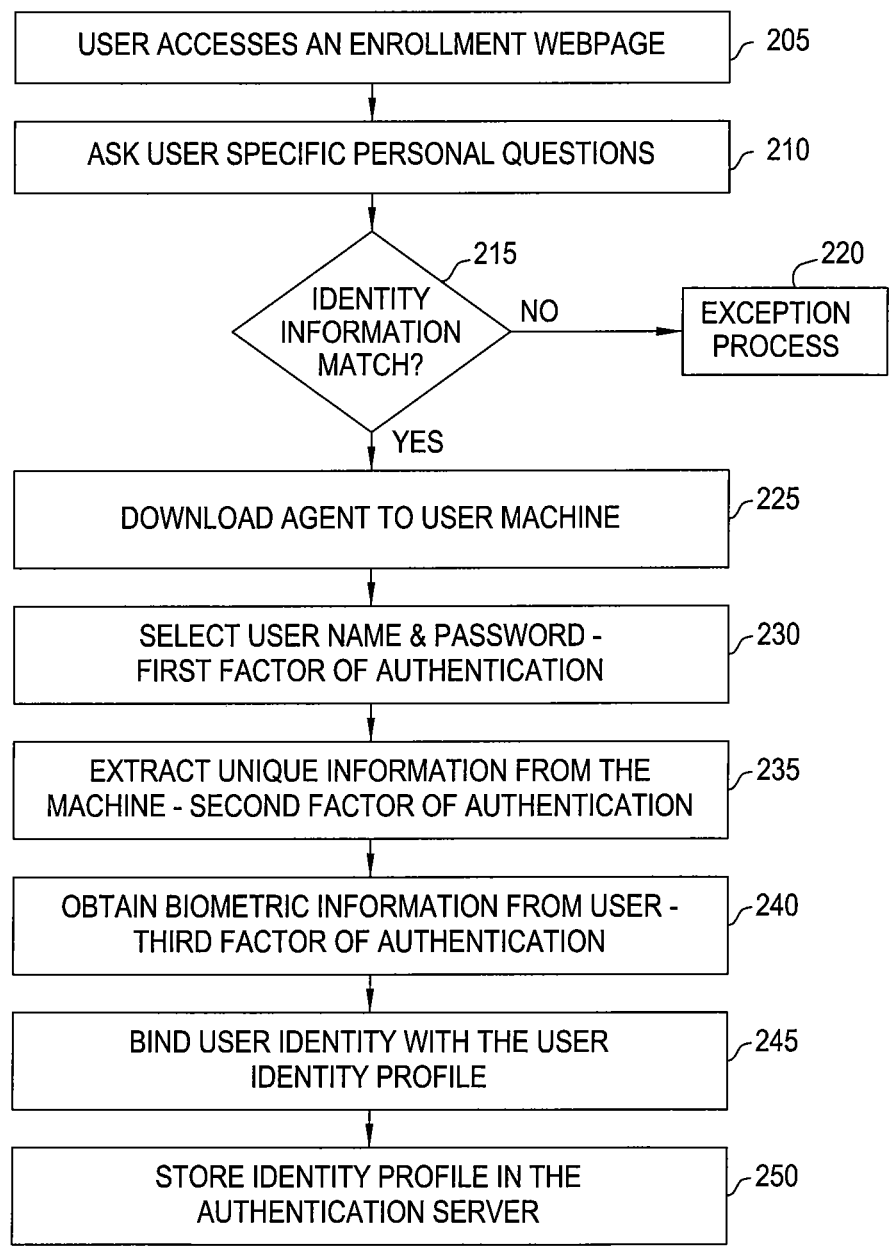
FIG. 2 is a flow chart of method steps for enrolling a user in a security service, according to one embodiment of the invention.

FIG. 2 is a flow chart of method steps for enrolling a user in a security service, according to one embodiment of the invention. Although the method steps are described in the context of the system of FIG. 1, any system configured to perform the method steps, in any order, is within the scope of the invention. Generally, the enrollment process 200 is used to verify the identity of the user, establish multi-factors of authentication and bind the verified identity of the user to the multi-factors of authentication. As will be discussed herein, verifying the user identity during the enrollment process 200 may include having the user answer specific personal questions e.g. amount of last check deposited, date of last withdrawal, previous residential address, etc. The answers are then checked against a known answer from a data source, such as the institution and/or third party consumer data base to verify that the user is who the user claims to be. Some examples of the multi factors of authentication are—the identification of the user, the identification of the machine, the biometric identity of the user, etc. It should be noted that the enrollment process is a one-time process for each user. After the enrollment process 200 is complete, the user is able to perform the secure access transaction 300 or the secure payment transaction 400, described below, without having to repeat the enrollment steps. The process of verifying identity significantly reduces the chance of a malicious party claiming to be the user. The process of binding the verified identity to the multi-factors of authentication eliminates the cumbersome process of proving the identity of the user at every transaction while providing the same level of security as though the user answered the identity questions, such as the specific personal questions each time.

The enrollment process 200 begins in step 205, where the user accesses an enrollment webpage. In one embodiment, the enrollment webpage is generated by the institution server 140 and downloaded to the user machine 105 when the user attempts to electronically access an account held with the institution. The enrollment webpage is configured to educate the user about the enrollment process and subsequently start the user identification process of step 210.

In step 210, the user is asked specific personal questions in which only the user knows the answer in order to generate a verified user identity. The questions may relate to dynamic data that frequently changes and is known only by the institution, such as "when was your last deposit," "what was the last check number," "who was the check written to" or "who last deposited money in the financial institution", "what was your last take home pay amount." The personal questions may relate to static data that does not change, such as "what car did you drive before your current car," "what is your social security number, date of birth, mother's maiden name" or "what address did you live at before your current address." In step 215, the answers given by the user is compared to known answers in a data source, such as data at the institution or data held at third party data bases, to verify the identity of the user. If the answers do not match the known answers in the data source, then, in step 220, an exception process is activated. The exception process may include a verification of the user over the phone. Additionally, the exception process may include the user making a personal appearance at a specific location. The exception process in step 220 may be any type of process known in the art to verify the identity of the user.

In step 225, the security agent 110 is downloaded to the user machine 105 after the identity of the user is established. In one embodiment, the security agent 110 is downloaded directly from the institution server 140 via the network 120. In another embodiment, the security agent 110 is downloaded via the network 120 from the authentication server 125. In any case, the security agent 110 is configured to interact with both the authentication server 125 and the institution server 140.

In step 230, a user name and password is selected to establish the first factor of authentication. In one embodiment, the user selects the user name and password. In another embodiment, the authentication server 125 or the institution sever 140 generates the user name and/or the password. In any case, the user name and/or password are used during the secure access transaction 300 and the secure payment transaction 400, described below.

In step 235, unique information from the user machine 105 is extracted by the security agent 110 to establish the second factor of authentication. As set forth above, the information may include any number of different types of data associated with the user machine 105. Again, the information may include the IMEI or the IMSI which relate to mobile devices. The information may include the geolocation of the user machine 105. The information may also include machine level attributes, such as a Device ID, a Vendor ID, data at a SMM memory space, a memory type, a memory clock, hard drive serial number, chipset information, data at different locations in firmware, or information available in Microcode patch, a checksum of firmware, or BIOS. Further, the information may include system level attributes, such as a MAC address, a hard drive serial number, interrupt routing, GPIO routing, PCI DevSel routing, a map of hardware configuration, or an operating system registry. Additionally, the information may relate to system pattern extraction, such as a directory structure or a list of installed applications. No matter what type of select data is extracted from the user machine 105, the data or a combination of different types of data should be unique to the user machine 105 in order to establish the second factor of authentication.

In step 240, the biometric information is collected in order to establish the third factor of identity. As set forth herein, the biometric data may include specific typing patterns of the user or biometric data generated by a biometric device, such as a fingerprint device or an iris pattern device. Although each factor of authentication was discussed in steps 230, 235 and 240, it should be understood, however, that any of the factors may be an optional factor of authentication in the enrollment process 200 without departing from principles of the present invention.

In step 245, the verified user identity from step 215 is connected (or bound) to the user identity profile 115 which generally comprises the data collected in steps 230-240. The connecting (or binding) of the verified user identity to the factors of authentication allows the user to engage in the secure access transaction 300 or the secure payment transaction 400 without having to repeat the enrollment steps. In other words, the binding of the identity with the factors of authentication eliminates the cumbersome process of proving the identity of the user at every transaction while providing the same level of security as though the user answered the identity questions (the specific personal questions) every time.

In step 250, a copy of the profile 115 is stored in the user profiles database 130 in the authentication server 125. During the secure access transaction 300 and the secure payment transaction 400, the security agent 110 interacts with the authentication server 125 by comparing the data from the user and the user machine with the user profile 115 stored in the user profiles database 130 to establish the identity of the user before proceeding with the transaction. It should be noted that in one embodiment the user is able to use the secure access transaction 300 and the secure payment transaction 400 without providing any sensitive personal data, such as a credit card number, a debit card number, etc. In another embodiment, the user interacts directly with an institution to verify the identity of the user. Then the institution issues a one-time credential, such as an account number and/or password. The one-time credential is used during the authentication process of the user to establish the identity of the user before proceeding with the secure access transaction 300 or the secure payment transaction 400.

Secure Access Transaction

Figure 3:
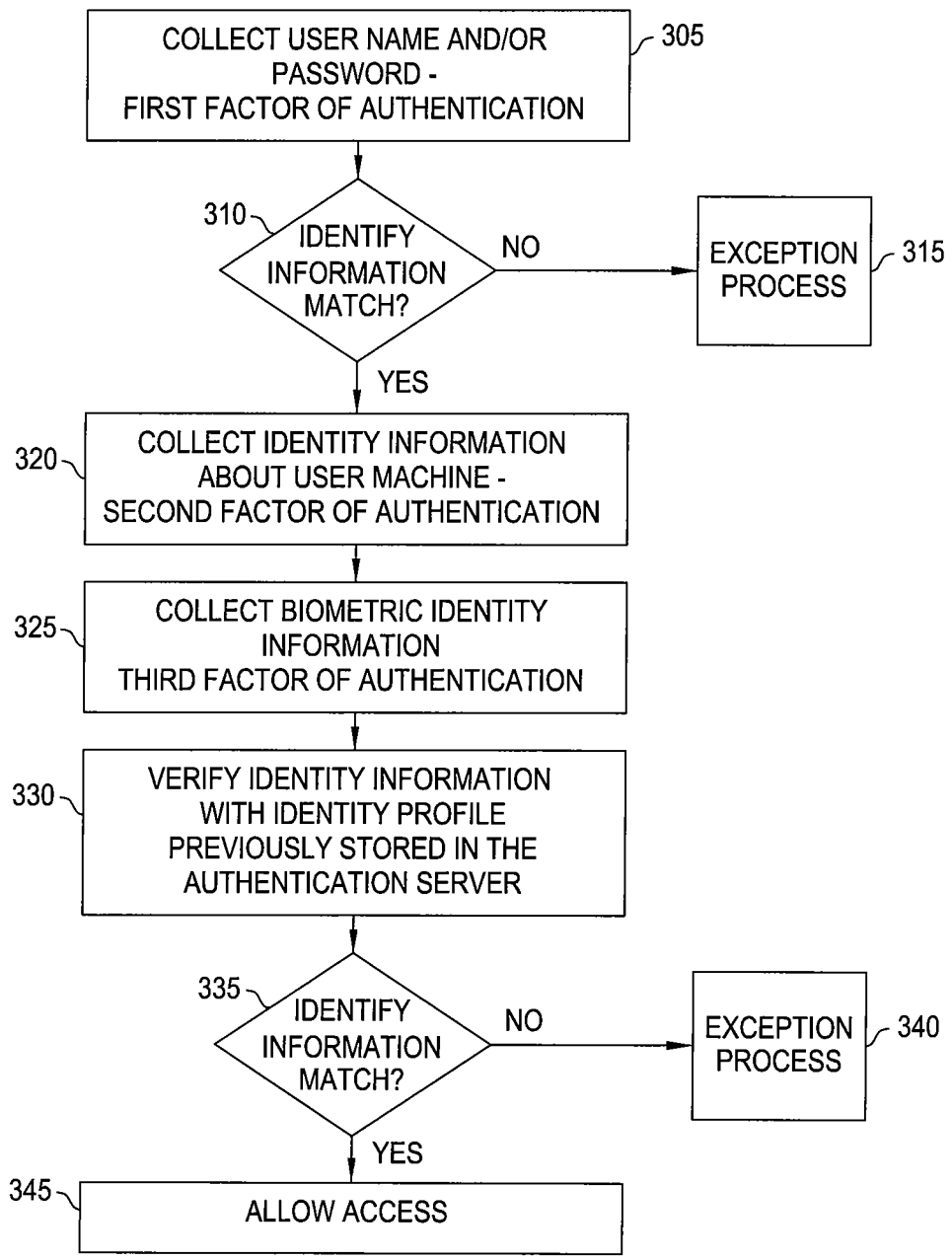
FIG. 3 is a flow chart of method steps for securely accessing a user account, according to one embodiment of the invention.

FIG. 3 is a flow chart of method steps for securely accessing a user account, according to one embodiment of the invention. Although the method steps are described in the context of the system illustrated in FIG. 1, any system configured to perform the method steps in any order is within the scope of the invention. Generally, the secure access transaction 300 is a transaction where the user attempts to electronically access an account held at the institution via the institution server 140. Some examples of an institution may be a financial institution, a government agency, a medical institution or a business. During the secure access transaction 300, the security agent 110 interacts with the authentication server 125 via the network 120 to ensure that the user is properly authenticated prior to giving the user access to the relevant accounts held at the institution.

The secure access transaction 300 begins with the security agent 110 interacting with the user at a log-on webpage of the institution. In one embodiment, the security agent 110 automatically activates after the security agent 110 detects the log-on webpage of the institution. For instance, the security agent may detect the institution log-on webpage by reading the source code of the webpage, such as the HTML code or by reading a trigger, such as a header or an identification number embedded in the log-on webpage. In another embodiment, the user activates the security agent 110 to perform the secure access transaction 300. For instance, the user may select a button on the webpage to activate the security agent 110. In a further embodiment, the institution activates the security agent 110 and requires the user to use the security agent 110 during the secure access transaction 300.

In step 305, the security agent 110 prompts the user to enter his or her username and/or password in order to determine the first factor of authentication. In step 310, the username and/or password entered in step 305 is compared to the username and/or password previously stored in the user profiles database 130. If the username and/or password does not match the user profile in the user profiles database 130, then an exception process is activated in step 315 to determine that the user is who the user claims to be. The exception process in step 315 may be any type of standard industry process known in the art to aid a user who has forgotten a user name and/or password. For instance, the exception process may include requiring the user to go through the enrollment process 200 again to create a new user name and/or password. The exception process may also include having the user answer a security question in order to determine that the user is who the user claims to be. The exception process may also include sending the user name and/or password to a user email address or sending a text message to a user cellphone.

In step 320, the security agent 110 collects information which is associated with the user machine 105 in order to establish the second factor of authentication. As previously set forth herein, the information associated with the user machine 105 may include a variety of different information, such as information related to the IMEI, the IMSI, the geolocation, machine level attributes, system level attributes, or system pattern extraction.

In step 325, the security agent 110 collects biometric information from the user in order to establish the third factor of identity. Again, the biometric data may include specific typing patterns of the user or biometric data generated by a biometric device, such as a fingerprint device or an iris pattern device. Although each factor of authentication was discussed in steps 305, 320 and 325, it should be understood, however, that any of the factors may be an optional factor of authentication in the secure access transaction 300 without departing from principles of the present invention.

In steps 330 and 335, the authentication server 125 verifies that the identity data collected in steps 320 and 325 matches the data included in the user profile previously stored in the user profiles database 130 on the authentication server 125. If the idenity data collected in steps 320 and 325 does not match the user profile in the user profiles database 130, then an exception process is activated in step 340. Depending on the type of mismatch, the exception process in step 340 may include limited access to the account or the exception process may require the collection of additional data or that the user to go through the enrollment process 200 again. For instance, if there is small mismatch, such as a wrong geolocation due to the user travelling or a different hard drive serial number due the user upgrading the user machine, then the user may still be allowed access to the account after collecting additional data. If there is a large mismatch, then the user may be required to go through the enrollment process 200 again in order to establish the identity of the user and the factors of authentication. If the identity data collected in steps 320 and 325 does match the user profile in the user profiles database 130, then the user is allowed access in step 345 to the account at the institution.

Secure Payment Transaction

Figure 4A:
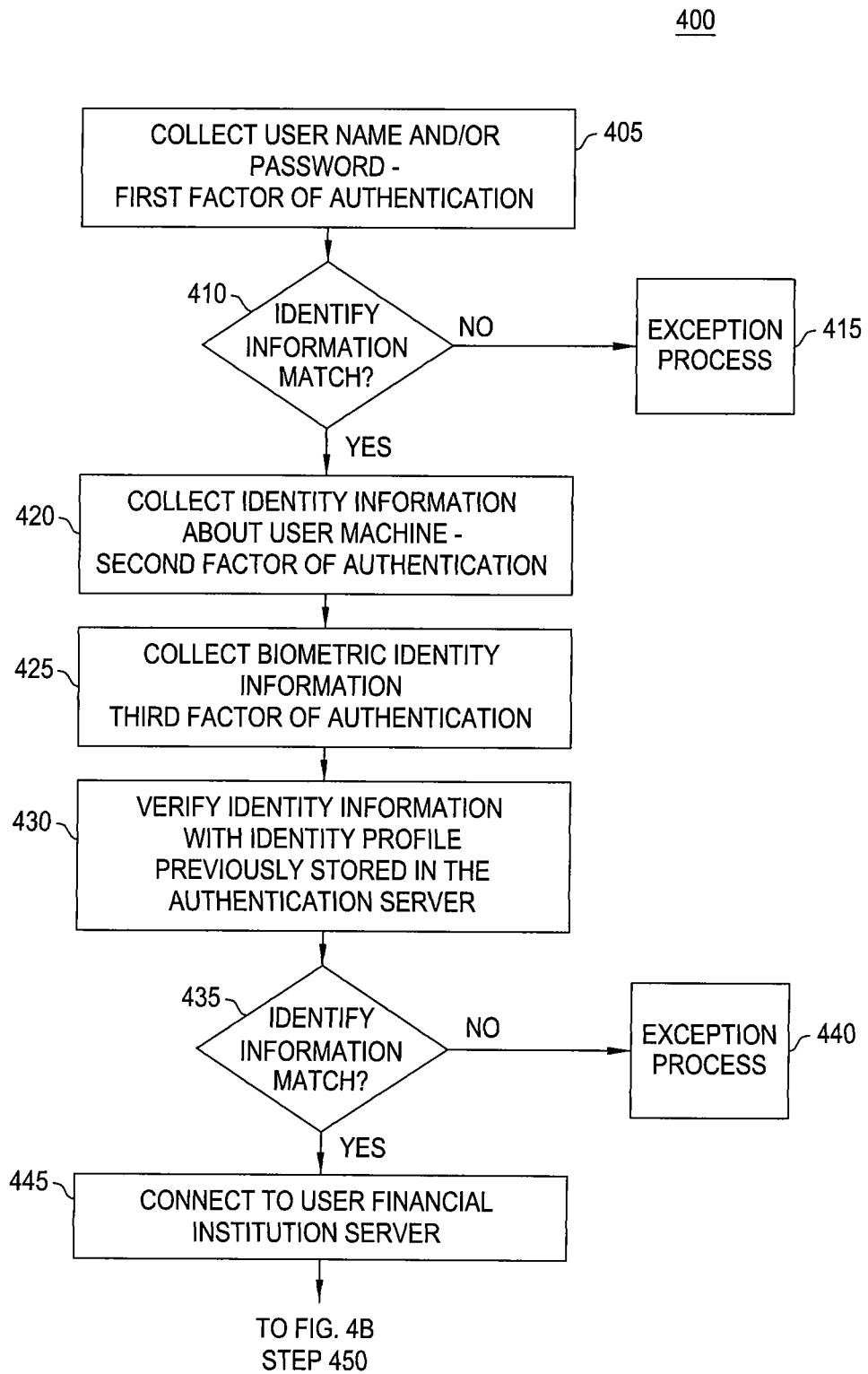
FIGS. 4A and 4B are a flow chart of method steps for making a secured payment, according to one embodiment of the invention.
Figure 4B:
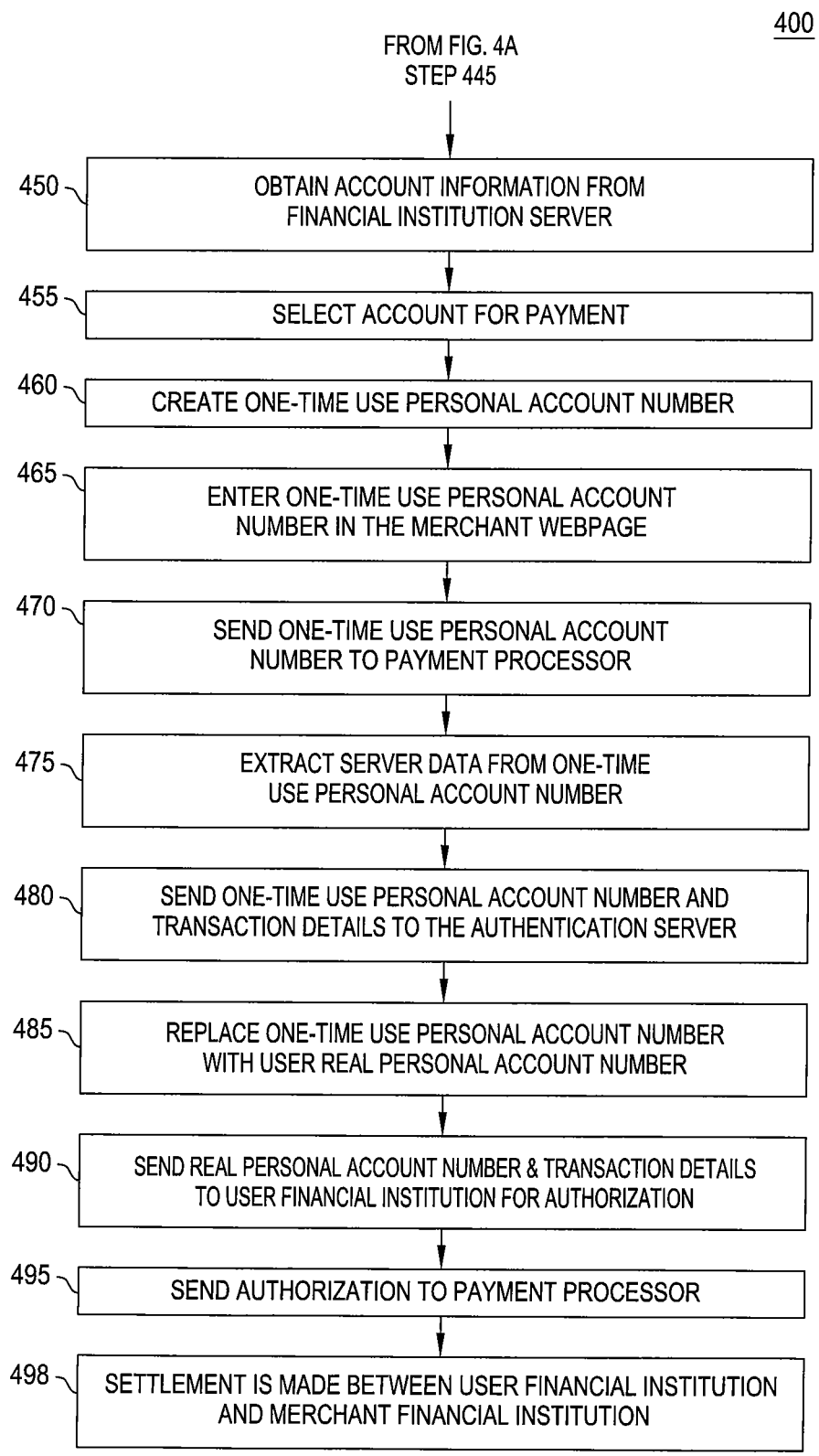

FIGS. 4A and 4B are a flow chart of method steps for making a secure payment, and FIG. 5 is a conceptual block diagram of a system 500 through which a secure payment may be made, according to one embodiment of the invention. Although the method steps are described in the context of the system illustrated in FIG. 5, any system configured to perform the method steps in any order is within the scope of the invention. Generally, the secure payment transaction 400 is a transaction where the user purchases a product or a service from an on-line merchant 505. During the secure payment transaction 400, the security agent 110 interacts with the authentication server 125 via the network 120 to ensure that the user is properly identified and authenticated prior to the user finalizing the purchase of the product or the service from the on-line merchant 505. The security agent 110 also is configured to interact with the different elements of system 500 to facilitate the actual on-line payment. Additionally, in the secure payment transaction 400, the institution server 140 is represented as a user financial institution server.

The secure payment transaction 400 begins with the security agent 110 interacting with the user at a payment webpage of the online merchant 505. In one embodiment, the security agent 110 automatically activates after the security agent 110 detects the payment webpage of the online merchant 505. For instance, the security agent may detect the online merchant 505 payment webpage by reading the source code of the webpage, such as the HTML code for credit card information e.g. card type, expiry date, CVV2 code, etc. or by reading a trigger, such as a header or an identification number embedded in the payment webpage. In another embodiment, the user activates the security agent 110 to perform the secure payment transaction 400. For instance, the user may select a button on the webpage to activate the security agent 110. In a further embodiment, the online merchant 505 activates the security agent 110 and requires the user to use the security agent 110 during the secure payment transaction 400.

Figure 6:
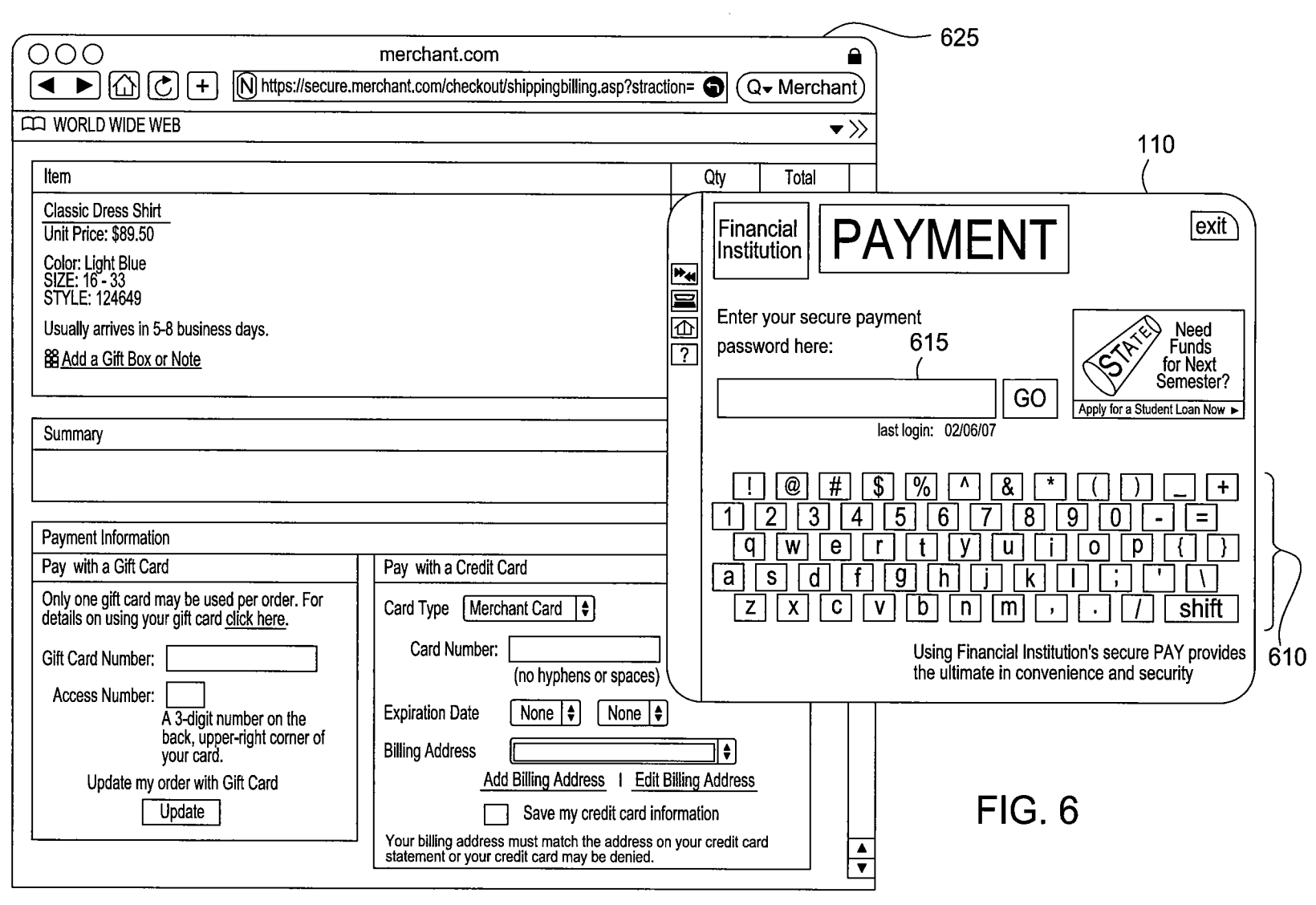

In step 405, the security agent 110 prompts the user to enter his or her username and/or password in order to determine the first factor of authentication. In one embodiment, the user enters his or her username and/or password through the standard key entry method of the user machine 105. In another embodiment, referring now to FIG. 6, the security agent 110 prompts the user to enter a username and/or password directly in a box 615 by using a keypad 610 on the security agent 110. The keypad 610 is manipulated by using a mouse (not shown) to push the buttons on the keypad 610. Placing the keypad 610 on the security agent 110 is a security mechanism designed to prevent a keylogger from monitoring and stealing the password. In other words, if the password were entered into the box 615 by using a standard keyboard (not shown), then a keylogger may be able to monitor the keystrokes of the user and steal the password. As a further security mechanism, the location of the keys on keypad 610 will systematically change between uses to prevent a mouse logger from monitoring and stealing the password. Additionally, since the security agent 110 directly communicates with the authentication server 125 rather than through a conventional webpage, the threat of "phishing" by presenting the user with bogus webpages is eliminated. One skilled in the art will recognize that the security mechanisms set forth herein may be equally applicable to any transaction that involves the security agent 110, such as the enrollment process 200 or the secure access transaction 300.

The security agent 110 is also configured to encrypt the data transmissions generated by the security agent 110 as the security agent 110 interacts with other components in the system. In one embodiment, the security agent 110 has a cryptographic system that uses two keys, such as a public key that is known by other components in the system 500 and a private key that is known only to the recipient of the data transmission. For instance when the security agent 110 wants to send a secure data transmission to the authentication server 125, the security agent 110 uses the public key to encrypt the data. The authentication server 125 then uses the private key to decrypt the data. An important element of this cryptographic system is that the public and private keys are related in such a way that only the public key can be used to encrypt data and only the corresponding private key can be used to decrypt the data. As a further security mechanism, the public private key pair may be randomly changed for each session or from time to time. One skilled in the art will recognize that the security mechanisms set forth herein may be equally applicable to any transaction that involves the security agent 110, such as the enrollment process 200 or the secure access transaction 300.

In step 410, the username and/or password entered in step 405 is compared to the username and/or password previously stored in the user profiles database 130. If the username and/or password does not match the data in the user profiles database 130, then an exception process is activated in step 415 to determine that the user is who the user claims to be. The exception process in step 415 may be any type of standard industry process known in the art to aid a user who has forgotten a user name and/or password. For instance, the exception process may include requiring the user to go through the enrollment process 200 again to create a new user name and/or password. The exception process may also include having the user answer a security question in order to determine that the user is who the user claims to be. The exception process may also include sending the user name and/or password to a user email address or sending a text message to a user cellphone.

In step 420, the security agent 110 collects information which is associated with the user machine 105 in order to establish the second factor of authentication. As previously set forth herein, the information associated with the user machine 105 may include a variety of different information, such as information related to the IMEI, the IMSI, the geolocation, machine level attributes, system level attributes, or system pattern extraction.

In step 425, the security agent 110 collects biometric information from the user in order to establish the third factor of authentication. Again, the biometric data may include specific typing patterns of the user or biometric data generated by a biometric device, such as a fingerprint device or an iris pattern device. Although each factor of authentication was discussed in steps 405, 420 and 425, it should be understood, however, that any of the factors may be an optional factor of authentication in the secure payment transaction 400 without departing from principles of the present invention.

In steps 430 and 435, the authentication server 125 verifies that the identity data collected in steps 420 and 425 matches the data included in the user profile previously stored in the user profiles database 130 on the authentication server 125. If the identity data collected in steps 420 and 425 does not match the user profile in the user profiles database 130, then an exception process is activated in step 440. Depending on the type of mismatch, the exception process in step 440 may allow a payment of a reduced amount to be made during the secured payment transaction or the exception process may require the user to go through the enrollment process 200 again. For instance, if there is small mismatch, such as a wrong geolocation due to the user travelling or a different hard drive serial number due the user upgrading the user machine, then the user may still be allowed to make an online payment after collecting additional data. If there is a large mismatch, then the user may be required to go through the enrollment process 200 again in order to establish the identity of the user and the factors of authentication before proceeding in the secure payment transaction 400. If the identity data collected in steps 420 and 425 does match the user profile in the user profiles database 130, then the security agent connects to the user financial institution server 140 in step 445 via the network 120.

In step 450, the security agent 110 requests financial account information from the institution server 140 about the user's account(s) held at the institution. Typically, the financial information relates to the different accounts that are available to make a payment to the on-line merchant 505, such as a savings account or a checking account. Additionally, the financial information may include credit cards, lines of credit, equity lines of credit, and the like. In one embodiment, a bank line of credit can be established during the enrollment process or during the merchant transaction process. The bank line of credit then can be considered a virtual credit card for purposes of the merchant transaction. Therefore, in addition to a conventional credit card, this virtual credit card and/or savings account and/or checking account may be used as a payment means for the on-line transaction in step 460, below.

In step 455, the user selects an account for payment in the secure payment transaction 400. Referring now to FIG. 7, after the security agent 110 obtains the financial information from the institution server 140, the security agent 110 displays an account list 705 which is a list of accounts available to pay the on-line merchant 505. Essentially, the security agent 110 becomes an automatic teller machine, whereby the user selects the account from the list of accounts presented by the security agent 110, and then the security agent 110 facilitates the payment to the on-line merchant 505, as discussed below.

In step 460, the authentication server 125 creates a one-time use personal account number which is used in the secured payment transaction 400. The one-time use personal account number is a sixteen digit number. Similar to the conventional credit card number, the one-time use personal account number includes a number prefix, commonly referred to as Network Identification Number, which is the sequence of digits at the beginning of the number that indicates the entity to which a credit card number belongs. In one embodiment, the authentication server 125 creates an expiration date which is used in the secured payment transaction 400. In another embodiment, the authentication server 125 creates a one time use security code.

Figure 8:
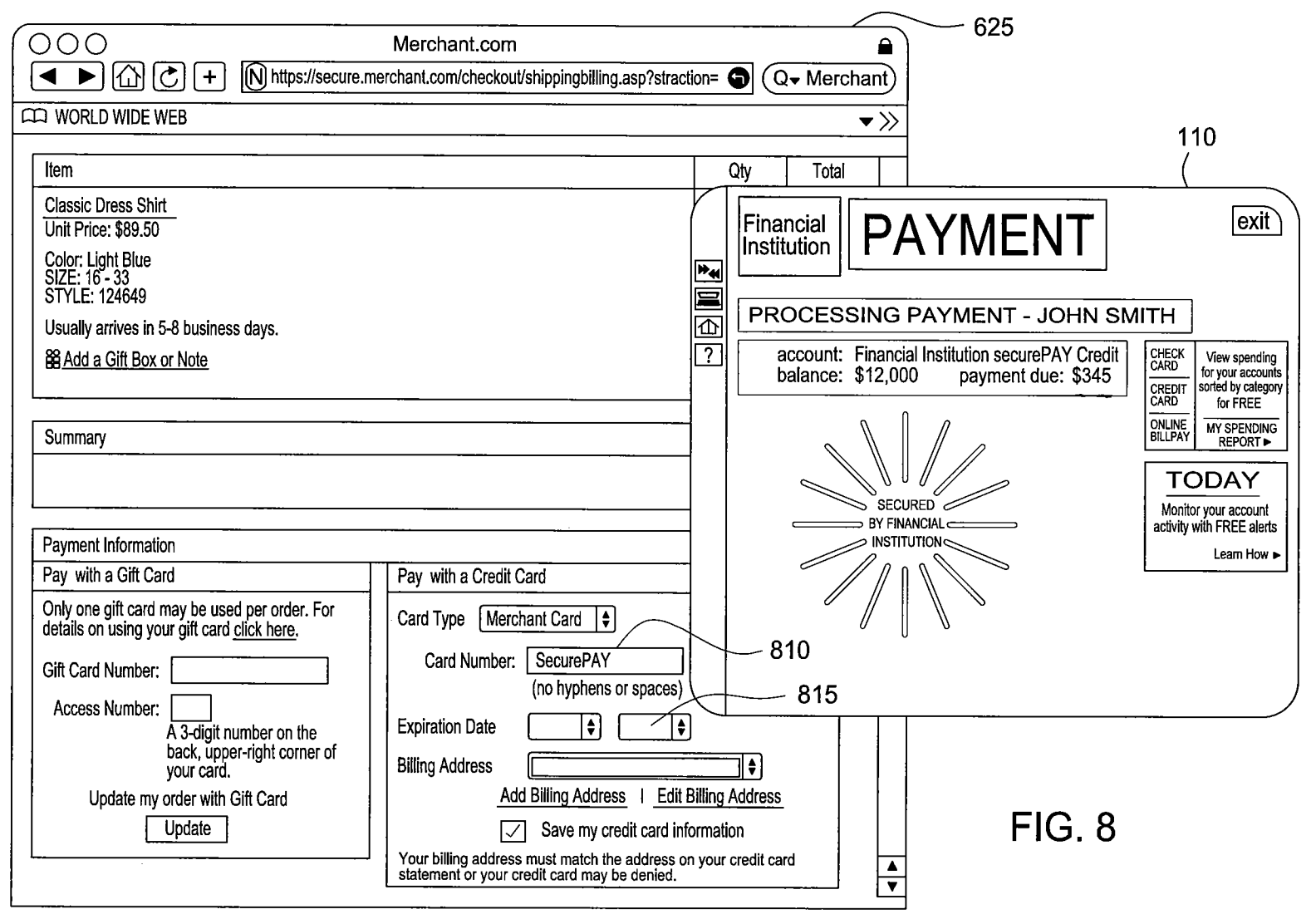

In step 465, the one-time use personal account number is entered into the merchant webpage. In one embodiment, the security agent 110 populates a payment field 810 of the payment page 625 of the on-line merchant 505 with the one-time use personal account number. In another embodiment, the security agent 110 populates an expiration date field 815 of the payment page 625 of the on-line merchant 505 with the expiration date. In one embodiment, the security agent 110 may hide data in the payment field 810 with a phrase such as "securepay," as shown in FIG. 8. Alternatively, the security agent 110 can hide data in the payment field 810 of the payment page 625 with "**********" reflecting the format of a conventional credit card number. In another embodiment, the user may populate the payment field 810 with the one-time use personal account number. In another embodiment, the user may populate the expiration date field 815 with the expiration date. In a further embodiment, the user may select a button on the payment page 625 to input the one-time use personal account number.

The utilization of the one-time use personal account number has several benefits. For instance, the one-time use personal account number has the same format as a conventional credit card number and therefore the on-line merchant 505 does not have to modify the format of the payment webpage 625 in order to accept the payment from the security agent 110. Another benefit of the one-time use personal account number is that the personal account number can only be used one time and therefore even if the number is stolen, the personal account number has no value beyond the current transaction. Further, the number cannot be processed through traditional credit card processing networks due to the format of the number.

Referring back to FIG. 4B, in step 470, the one-time personal account number is sent to a payment processor 510. In step 475, the payment processor 510 extracts server data from the one-time personal account number, such as the Network Identification Number, which is the sequence of digits at the beginning of the one-time use personal account number, in order to determine the personal account number belongs to the authentication server 125. In step 480, the payment processor 510 sends the one-time personal account number and transaction details to the authentication server 125. The transaction details may include the merchant name, the merchant ID, and the amount of the transaction.

In step 485, the authentication server 125 replaces the one-time personal account number with a user real personal account number that relates to the account which the user selected in step 455. In step 490, the authentication server 125 sends the real personal account number and the transaction details to the user financial institution for authorization. At this point, the user financial institution server 140 verifies that the user account has sufficient funds to cover the payment transaction. If there are insufficient funds in the selected account, then the security agent 110 prompts the user to select another account for payment. If there are sufficient funds in the selected account, then a payment authorization is sent to the payment processor 510 and security agent 110 in step 495. In step 498, the institution server 140 interacts with the merchant financial server 515 via the settlement network 520 to transfer the funds from the institution server 140 to the merchant financial server 515.

While the foregoing is directed to embodiments of the present invention, other and further embodiments of the invention may be devised without departing from the basic scope thereof, and the scope thereof is determined by the claims that follow.

I claim:

1. A method for enrolling a user in a system configured to identify and authenticate the user, the method comprising:
   collecting a username and password to identify the user;
   extracting device data from a user machine to uniquely identify the user machine;
   generating a user profile based upon the device data, and the username and password;
   encrypting the user profile using a public key;
   transmitting the encrypted user profile to a server machine to be stored;
   verifying an identity of the user to create a verified user identity;
   decrypting the encrypted user profile using a recipient private key;
   issuing one-time payment credentials to the user that are valid for only a single payment transaction;
   receiving the one-time payment credentials at the server machine and replacing the one-time payment credentials with a real account information underlying the one-time payment credentials; and
   sending the user's real account information to a financial institution for processing.

2. The method of claim 1, wherein the one-time payment credentials include an account number, an expiration date and a security code.

3. The method of claim 1, further comprising the step of binding the verified user identity with the user profile.

4. The method of claim 3, wherein the step of binding the verified user identity with the user profile eliminates the identity verification of the user at each transaction.

5. The method of claim 1, wherein the step of verifying the identity of the user comprises prompting the user to answer at least one specific personal question and comparing the user's answer to a known answer.

6. The method of claim 5, wherein the known answer is from an institution data base or a third party data base.

7. The method of claim 2, wherein the account number, expiration date and the security code are automatically input into respective payment fields of a web page.

8. The method of claim 1, wherein the extracted device data may include a device ID, a vender ID, information in a Microcode patch, data accessed through PCI configuration space or data accessed through a SMM memory space.

9. The method of claim 1, wherein the extracted device data may include chipset hidden and/or unhidden registers, graphics card hidden and/or unhidden registers, interrupt routing, GPIO routing, PCI Device Select routing or a directory structure.

10. The method of claim 1, wherein the extracted device data may include installed applications, data at different locations in firmware, a memory type, or a memory clock speed.

11. The method of claim 1, wherein the extracted device data may include an amount of memory, a size of a hard drive, or a name of a maker of the hard drive.

12. The method of claim 1, wherein the extracted device data may include a MAC address, a hard drive serial number, a check sum of firmwares/BIOS, or an operating system registry.

13. The method of claim 1, wherein the extracted device data may include a CPU type, a CPU version, or a CPU clock speed.

14. The method of claim 1, further comprising the step of encrypting the user profile before transmitting the user profile to the server machine.

15. The method of claim 1, wherein the extracted device data may include machine level attributes and/or system level attributes and/or system patterns and/or user machine geo location.

16. The method of claim 1, further comprising:
collecting biometric data from the user to identify the user of the machine, wherein the user profile is further based on the collected biometric data.

17. The method of claim 16, wherein the biometric data may include typing patterns of the user, fingerprint data, or iris pattern data.

18. The method of claim 1, wherein the one-time payment credentials is generated by the server machine.

19. A non-transitory computer-readable medium including a set of instructions that when executed by a processor cause the processor to enroll a user in a system configured to identify and authenticate the user, by performing the steps of:
collecting a username and password to identify the user;
extracting device data from a user machine to uniquely identify the machine;
generating a user profile based upon the device data, and the username and password;
encrypting the user profile using a public key;
transmitting the encrypted user profile to a server machine to be stored;
verifying an identity of the user to create a verified user identity;
decrypting the encrypted user profile using a recipient private key;
issuing one-time payment credentials to the user that are valid for only a single payment transaction;
receiving the one-time payment credentials at the server machine and replacing the one-time payment credentials with a real account information underlying the one-time payment credentials; and
sending the user's real account information to a financial institution for processing.

20. The non-transitory computer-readable medium of claim 19, wherein the server machine binds a verified user identity with the user profile.

21. The non-transitory computer-readable medium of claim 20, wherein the verified user identity is generated after prompting the user to answer at least one specific personal question and comparing the user's answer to a known answer.

22. The non-transitory computer-readable medium of claim 19, wherein the extracted device data may include machine level attributes and/or system level attributes and/or system patterns and/or a geo location of the user machine.

23. The non-transitory computer-readable medium of claim 19, further comprising the step of encrypting the user profile before transmitting the user profile to the server machine.

24. The non-transitory computer-readable medium of claim 19, further comprising:
collecting biometric data from the user to identify the user of the machine, wherein the user profile is further based on the collected biometric data.

25. A system for identifying and authenticating a user, the system comprising:
a server machine that includes a user profiles database; and
a computing device having a processor and a memory, wherein the memory includes a security agent program configured to:
collect a username and password to identify the user;
extract device data from the computing device to uniquely identify the computing device;
generate a user profile based upon the device data and the username and password;
encrypt the user profile with a public key;
transmit the encrypted user profile to the server machine to be stored;
verifying an identity of the user to create a verified user identity;
decrypting the encrypted user profile using a recipient private key;
issuing one-time payment credentials to the user that are valid for only a single payment transaction;
receiving the one-time payment credentials at the server machine and replacing the one-time payment credentials with a real account information underlying the one-time payment credentials; and sending the user's real account information to a financial institution for processing.

26. The system of claim 25, wherein the server machine is configured to bind a verified user identity with the user profile.

27. The system of claim 25, wherein the extracted device data may include machine level attributes and/or system level attributes and/or system patterns and/or computing device geo location.

28. The system of claim 25, further comprising;
collecting biometric data from the user to identify the user of the computing device, wherein the user profile is further based on the collected biometric data.

* * * * *

UNITED STATES PATENT AND TRADEMARK OFFICE
CERTIFICATE OF CORRECTION

PATENT NO. : 8,661,520 B2
APPLICATION NO. : 11/562330
DATED : February 25, 2014
INVENTOR(S) : Rajesh G. Shakkarwar Page 1 of 1

It is certified that error appears in the above-identified patent and that said Letters Patent is hereby corrected as shown below:

In the Claims:

Column 12, Claim 1, Lines 31-32, please delete "issuing one-time payment credentials to the user that are valid for only a single payment transaction;" and insert -- generating one-time payment credentials at the server machine that are valid for only a single payment transaction;

issuing the one-time payment credentials to the user; -- therefor;

Column 13, Claim 19, Lines 43-44, please delete "issuing one-time payment credentials to the user that are valid for only a single payment transaction;" and insert -- generating one-time payment credentials at the server machine that are valid for only a single payment transaction;

issuing the one-time payment credentials to the user; -- therefor;

Column 14, Claim 25, Lines 35-36, please delete "issuing one-time payment credentials to the user that are valid for only a single payment transaction;" and insert -- generating one-time payment credentials at the server machine that are valid for only a single payment transaction;

issuing the one-time payment credentials to the user; -- therefor.

Signed and Sealed this
Twenty-seventh Day of May, 2014

Michelle K. Lee
*Deputy Director of the United States Patent and Trademark Office*